United States Patent [19]

Sorensen et al.

[11] 3,984,158

[45] Oct. 5, 1976

[54] JOURNAL AND PILOT BEARINGS WITH ALTERNATING SURFACE AREAS OF WEAR RESISTANT AND ANTI-GALLING MATERIALS

[75] Inventors: Robert Keith Sorensen, Dallas; Anthony T. Rallis, Spring, both of Tex.

[73] Assignee: Dresser Industries, Inc., Dallas, Tex. ; by said Robert Keith Sorenson

[22] Filed: Sept. 10, 1973

[21] Appl. No.: 395,880

[52] U.S. Cl. .......................... 308/8.2; 308/DIG. 8; 29/149.5 PM
[51] Int. Cl.[2] ........................................ F16C 33/24
[58] Field of Search ................. 308/DIG. 5, DIG. 8, 308/8.2, 35, 237, 241; 29/149.5 PM, 149.5 DP

[56] References Cited
UNITED STATES PATENTS

| | | | |
|---|---|---|---|
| 2,365,562 | 12/1944 | Koehring | 29/149.5 PM |
| 2,592,277 | 4/1952 | Hammer | 308/8.2 |
| 2,706,693 | 4/1955 | Haller | 29/149.5 PM |
| 3,235,316 | 2/1966 | Whanger | 308/8.2 |

FOREIGN PATENTS OR APPLICATIONS 761,954   11/1956   United Kingdom............ 308/DIG. 5

Primary Examiner—James B. Marbert
Assistant Examiner—Robert Saifer
Attorney, Agent, or Firm—Eddie E. Scott

[57] ABSTRACT

The journal and/or pilot bearings of a rotary cone earth boring bit are constructed to include alternating areas of wear resistant materials and anti-galling materials. The bearing matrix is formed by compressing a powdered alloy in the shape of the desired bearing element. The bearing matrix is sintered, thereby forming a porous bearing element. An anti-galling material is infiltrated into the porous matrix of the bearing element and the bearing element is hardened. The resulting bearing element includes areas of wear resistant materials and areas of anti-galling materials.

9 Claims, 5 Drawing Figures

3,984,158

JOURNAL AND PILOT BEARINGS WITH ALTERNATING SURFACE AREAS OF WEAR RESISTANT AND ANTI-GALLING MATERIALS

BACKGROUND OF THE INVENTION

The present invention relates to bearing systems and, more particularly, to journal and pilot bearings with improved performance and longer lifetime characteristics. The bearing system of the present invention is especially adapted for use on that type of rock bit popularly known as a three cone bit; however, its use is not restricted thereto and the bearing system of the present invention can be used in other equipment wherein an improved bearing system is required.

A rotary rock bit must operate under very severe environmental conditions and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones thereby providing a longer useful lifetime for the cones. This has resulted in the bearing system being first to fail during the drilling operation. Consequently, a need exists for an improved bearing system to extend the useful lifetime of the bit.

In order to obtain high penetration rates with a rotary rock bit in some formations, it is necessary to apply heavy loads on the bit and to operate the bit at a moderate speed. With other formatioins only moderate loads are required but the bit must be operated at relatively high speeds. The rock bit operates under a highly corrosive environment and is subjected to temperature extremes. The drilling operation may be conducted thousands of feet underground wherein elevated temperatures are encountered. The bit is continually flushed by a circulating drilling fluid to cool the bit and carry away the drill cuttings. This fluid is generally water with chemicals added to control water loss or to control viscosity and/or pH. Some of these chemicals may result in a corrosive drilling fluid. The drilling cuttings, the materials encountered in the eath formations, barites added for fluid weight control, and the chemical composition of the drilling fluid combine to create a corrosive and abrasive drilling environment.

The bit is subjected to a wide range of fluid pressures during the drilling operation. When the bit is at the surface, it is of course only subjected to atmospheric pressure; however, when lowered into the well bore, it will be exposed to very high fluid pressure because of the head of the fluid in the well bore. In view of the circumstances explained above, it can be appreciated that a bearing system for a rotary rock bit must include exceptional performance characteristics in a limited geometrical configuration. Since the entire drill string must be withdrawn to replace the bit when it fails, it is highly desirable to have the bearing system operate for an extended period of time.

DESCRIPTION OF THE PRIOR ART

In U.S. Pat. No. 2,595,903 to K. H. Swart, patented May 6, 1952, a three cone rock bit is shown. The bit includes three shanks which are assembled together to form the bit. The lower end of each shank is formed into a journal and a generally conical tooth cutter is received over the journal. The bearing system includes friction-type bearings and anti-friction bearings. This patent sets out some of the problems encountered with rotary rock bits.

In U.S. Pat. No. 3,235,316 to J. R. Whanger, patented Feb. 15, 1966, a journal bearing for a rock bit is shown with alternating surface areas of wear-resistant and anti-galling materials. The bearing system disclosed in this patent includes grooves in one of the rotatable members with a soft metal having anti-galling characteristics positioned in the grooves.

In U.S. Pat. No. 2,096,252 to R. P. Koehring, patented Oct. 19, 1937, a porous bearing is formed by "briquetting" metal powders under high pressure. The porous bearing is sintered to form a rigid, porous structure. The sintered porous metal bearing is then subjected to an infiltration process wherein molten lead is absorbed by capillary action into the porous structure. The metal forming the porous bearing matrix structure may be copper, bronze, or brass.

In U.S. Pat. No. 2,706,693 to J. Haller patented Apr. 19, 1955, a process of impregnating metal bearings is shown. The bearing is formed by "briquetting" or pressing powdered iron to form the porous structure. The pressed bearing body is then subject to a process wherein sintering and infiltration occur simultaneously. The infiltration is accomplished during the sintering operation by the insertion of a core of copper or copper zinc alloy into the center of the bearing body. The copper insert melts and infiltrates into the pores of the powdered iron body leaving in its place a central void or cavity. The bearing body is then subjected to a second infiltration step where an antimony is "reinfiltrated" into the bearing structure. The "reinfiltrating metal" may be a mixture of antimony and lead, antimony and tin, lead and tin, lead alone, or tin alone.

SUMMARY OF THE INVENTION

The present invention provides a novel bearing system for earth boring bits. At least one of the bearing surfaces includes areas of wear resistant material and areas of anti-galling material. An alloy powder is compressed into the shape of the desired bearing element, thereby providing a porous matrix. The porous matrix is sintered. An anti-galling material is infiltrated into the porous matrix. The porous matrix is hardened, thereby providing a bearing element with a hard wear resistant surface having pores infiltrated with anti-galling material. The above and other features and advantages of the present invention will become apparent from a consideration of the following detailed description of the invention when taken in conjunction with the drawings.

DETAILED DESCRIPTION OF THE INVENTION

Figure 1:
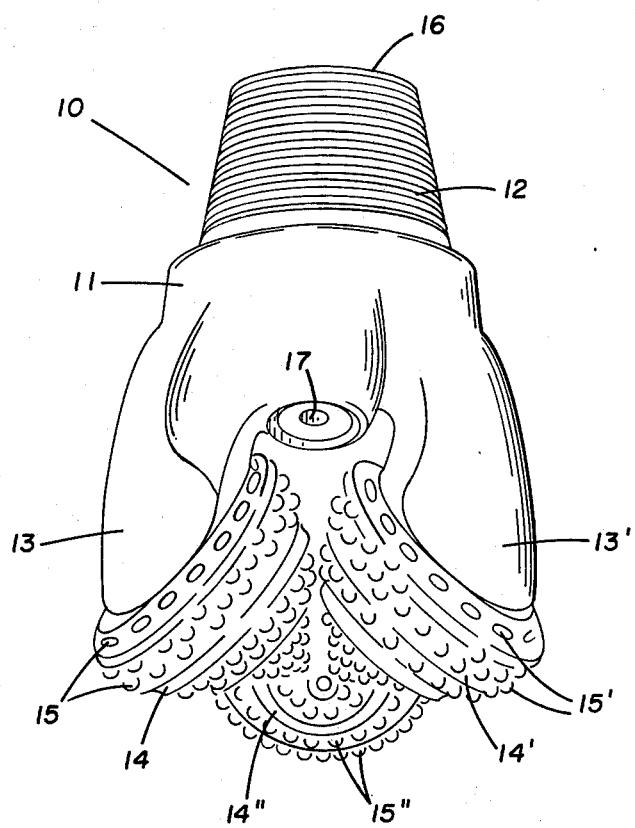
FIG. 1 is a pictorial view of a three cone rotary rock bit.

Referring to FIG. 1, a three cone jet-type rotary rock bit is shown and generally designated by the reference number 10. The bit 10 includes a bit body 11 including an upper threaded portion 12. The threaded portion 12 allows the bit 10 to be connected to the lower end of a rotary drill string (not shown). Depending from the bit body 11 are three substantially identical arms with two of the arms 13 and 13' being shown in FIG. 1. Three rotary cone cutters, 14, 14' and 14''are rotatably positioned on three bearing pins extending from the arms. Each of the cutters 14, 14' and 14'' includes cutting structures 15, 15' and 15'', respectively, on its outer surface adapted to disintegrate the formations as the bit 10 is rotated and moved through the formations. The cutting structure 15, 15' and 15'' is shown in the form of tungsten carbide inserts; however, it is to be understood that other cutting structures, such as steel teeth, may be used as the cutting structure on the cone cutters.

The bit 10 includes a central passageway 16 extending along the central axis of body 11 to allow drilling fluid to enter from the upper section of the drill string (not shown) immediately above and pass downward through three jet nozzles, one nozzle 17 being shown in FIG. 1, to the bottom of the well bore. In use, the bit 10 is connected as the lower member of a rotary drill string (not shown) and lowered into a well bore until the cone cutters 14, 14' and 14'' engage the bottom of the well bore. Upon engagement with the bottom of the well bore, the drill string is rotated, rotating bit 10 therewith. The cone cutters 14, 14' and 14'' rotate on their respective bearing pins. Drilled fluid is forced downward through the interior passage of the rotary drill string and the drilling fluid continues through the central passageway 16 of bit 10 passing through the nozzles to the bottom of the well bore, thence upward in the annulus between the rotary drill string and the wall of the well bore to the earth's surface.

Figure 2:
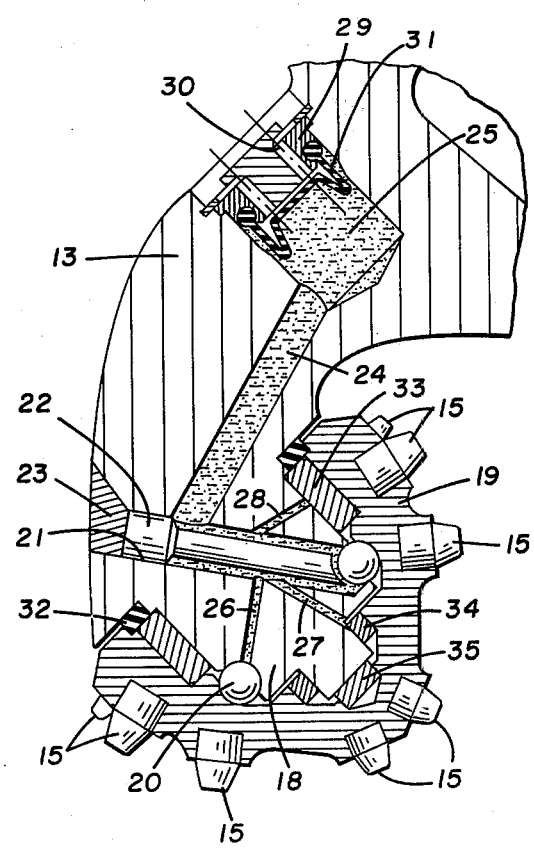
FIG. 2 illustrates one-third of a three cone rotary rock bit, incorporating a bearing constructed in accordance with the present invention.

A cut-away view of one of the arms 13 of a bit incorporating a bearing system constructed in accordance with the present invention is shown in FIG. 2. The bit is adapted to be connected to a rotary drill string and operates in the manner previously described. The elongated lower portion of arm 13 forms a journal 18 and the shell 19 of rotatable cutter 14 is mounted upon journal 18. Positioned on the exterior surface of rotatable cutter 14 is the cutting structures 15. The cutting structures 15 consist of a series of tungsten carbide inserts. As the bit is rotated, the inserts contact and disintegrate the formations to form the earth borehole.

The bearing system constructed in accordance with the present invention insures free rotation of rotatable cutter 14 under the severe drilling conditions. A series of ball bearings 20 insure that the shell 19 of cutter 14 is rotatably locked on journal 18. The rotatable cutter 14 is positioned upon journal 18 and the series of ball bearings 20 inserted through a bore 21 extending into arm 13. After the ball bearings 20 are in place, plug 22 is inserted in bore 21 and welded therein by weld 23.

Journal 18 and arm 13 are also provided with a passage 24 to channel lubricant from a lubricant reservoir 25 to the areas between the various bearing surfaces. Passage 24 intersects bore 21 and plug 22 is of reduced diameter in this area to allow the lubricant to be channeled to the bearings. Additional passages 26, 27, and 28 allow the lubricant to be channeled from bore 21 to the bearings. Lubricant reservoir 25 is filled with a lubricant containing entrained particles of anti-galling material and a cap 29 locked in place on arm 13 to retain the lubricant in reservoir 25. Cap 29 is constructed so that a passage 30 communicates the interior of reservoir 25 with the outside of the bit. This allows pressure equalization and prevents pressure differentials from damaging the bearing system. A flexible diaphragm 31 serves to hold the lubricant in position and at the same time provides compensation for pressure changes.

The lubricant fills reservoir 25, passage 24, bore 21, additional passages 26, 27, and 28, and the spaces between the cutter shell 19 and journal 18. A flexible seal 32 contacts cutter shell 19 and forms a seal between cutter shell 19 and journal 18 to prevent loss of lubricant or contamination of the lubricant from materials in the well bore. As explained above, pressure on the lubricant is equalized by cap 29 and diaphragm 31 and the lubricant is not lost or contaminated during the drilling operation. As the bit is lowered into the well bore, it will be subjected to increasing fluid pressure the deeper it goes. If means had not been provided for equalizing the pressure on the lubricant, the pressure differential across seal 31 would be sufficient to rupture it.

Positioned in the inner surface of the shell 19 of cone cutter 14 is a journal bearing bushing 33 and a pilot bearing bushing 34. A thrust button 35 is positioned in the nose of the shell 19. The bushings 33 and 34 and the thrust button 35 are locked in cutter shell 19 by force fitting. The bearing surface areas of bushings 33 and 34 and thrust button 35 contain surfaces having alternating areas of wear resistant and anti-galling materials. The bearing surfaces have a hard wear resistant matrix with high strength and the self lubrication of the anti-galling material. The useful lifetime of the bearings are extended, thereby extending the useful lifetime of the bit.

Figure 3:
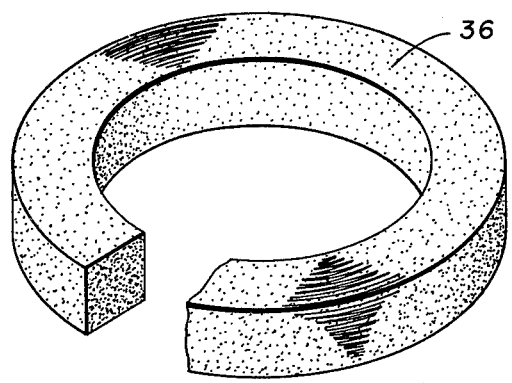
FIG. 3 illustrates a porous matrix of a bearing element.

Referring now to FIG. 3, the porous matrix 36 used for the pilot bearing bushing 34 is shown. The porous matrix 36 is formed by pressing an alloy powder into the shape of the desired bearing element. The alloy powder chosen for the porous matrix 36 is a low carbon nickel steel alloy powder consisting of AISI 4600 100 mesh particles. It is to be understood that other alloy powders can be used for the porous matrix 36 such as stainless steel particles.

Graphite or carbon is mixed with the alloy powder prior to pressing to obtain the desired final carbon content. For example, sufficient graphite is added to the alloy powder to provide the porous matrix 36 with 0.4 percent carbon content after the pressed matrix is sintered. A die lubricant is generally added to the alloy powder to lubricate the die and increase the green strength of the matrix prior to pressing. The lubricant die may, for example, be zinc stearate. The lubricant die burns off during sintering. The alloy powder is pressed using a force of 35–40 tons per square inch (cross-sectional area). This will provide the porous matrix 36 with an apparent density of 6.8 grams per cubic centimeter (85–87 percent theoretical density) after sintering.

Figure 4:
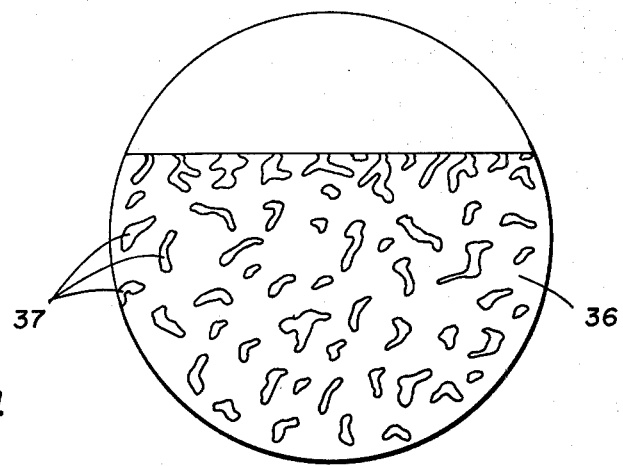
FIG. 4 is an enlarged view of a section of the porous matrix shown in FIG. 3.

The porous matrix 36 is sintered at 2050°F. for forty minutes. The graphite mixed with alloy powder diffuses into the steel during the sintering and combines with the steel to produce a homogenous structure with the desired carbon content. Diffusion of the carbon throughout the structure as well as diffusion bonding of the particles together requires temperatures above 1800°F. This diffusion process may take several hours at 1800°F. while taking less than 1 hour at temperatures above 2000°F. An enlarged view of a section of the porous matrix 36 is shown in FIG. 4. The porous matrix 36 contains a multiplicity of pores 37. Approximately 95 percent of the voids or pores 37 left in the matrix 36 are interconnected and can be filled with an anti-galling material by infiltration.

The porous matrix 36 is infiltrated with 85 percent silver 15 percent manganese alloy at a temperature of 2050°F. for forty minutes. The silver manganese alloy is placed on the porous matrix 36 and the heat is applied to allow capillary action and gravity to draw the silver into and fill the pores 37. It is to be understood that other anti-galling materials may be used as the infiltrating material. In general, the infiltrating material can be a metal or alloy having softness and anti-galling nature on the order of silver, silver alloys or babbit metals. Approximately 95 percent of the pores 37 are filled with silver.

After the porous matrix 36 has been infiltrated with silver the matrix 36 is hardened. The hardening may consist of through hardening or case hardening. The porous matrix 36 of the preferred embodiment is case hardened by pack carburizing at 1700°F. for 12 hours, heating to 1470° for one and one-half hours and quenching in an oil bath. The matrix 36 is then tempered and machined into the specific shape of the desired bearing element.

Figure 5:
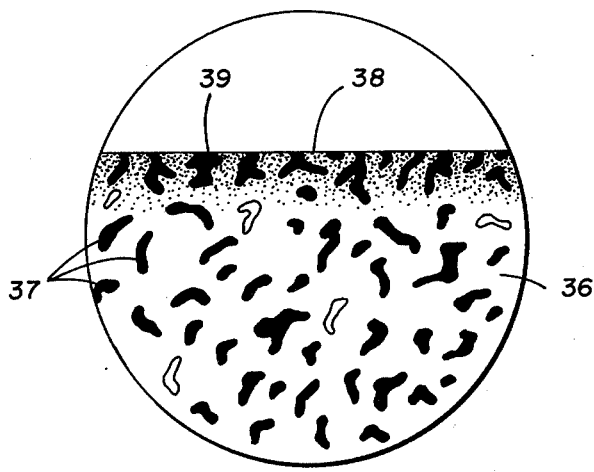
FIG. 5 is an enlarged view of the porous matrix shown in FIG. 3, after it has been case hardened.

Referring to FIG. 5, an enlarged view of a section of the porous matrix 36 is shown after the porous matrix has been case hardened. A substantial number of the pores 37 have been filled with the silver manganese anti-galling material. The case hardening step has made the surface 37 of the porous matrix 36 hard and wear resistant. The pores 37 at the surface containing the softer anti-galling material provide areas on the surface 38 that consist of an anti-galling material. The matrix material 36 has an apparent hardness greater than Rockwell C 20 whereas the surface 38 has an apparent hardness greater than Rockwell C 40.

The embodiments of the invention in which an exclusive property or privilege is claimed are defined as follows:

1. In a rotary rock bit with at least one bearing pin and a rotatable cutter mounted on said bearing pin, the improvement comprising a bearing element between said rotatable cutter and said bearing pin, said bearing element having a matrix of pressed porous sintered ferrous alloy powder, said matrix having a surface, and an anti-galling material infiltrated into said pressed porous sintered ferrous alloy powder matrix substantially deeper than said surface.

2. The bearing element of claim 1 wherein said matrix includes a multiplicity of interconnected pores with said matrix having a theoretical density of approximately 85–87 percent.

3. The bearing element of claim 1 wherein said matrix is case hardened thereby providing said matrix with a hard surface.

4. The bearing element of claim 3 wherein said surface has an apparent hardness greater than Rockwell C 40 and the matrix has an apparent hardness of greater than Rockwell C 20, 5. The bearing element of claim 4 wherein said matrix has a carbon content within the range of 0.04 percent to 1.5 percent.

6. A rotary rock bit, comprising:
   a body;
   a bearing shaft supported by said body; a rotary cutter adapted to be rotatably mounted on said bearing shaft.
   a bearing that promotes rotation between said rotary cutter and said bearing shaft, said bearing including a bearing element having a matrix of pressed porous sintered ferrous alloy powder and an anti-galling material infiltrated into said pressed porous sintered ferrous alloy powder matrix throughout substantially all of said matrix and extending throughout substantially all of said bearing element.

7. The bearing element of claim 6 wherein said matrix is a case hardened matrix.

8. A rotary rock bit, comprising:
   a head defining an internal chamber;
   a bearing pin depending from said head;
   a cone cutter adapted to be mounted on said bearing pin, said cone cutter having a concave cavity projecting from a cone mouth, said cavity and cone mouth positioned over said bearing pin;
   A seal element between said cone cutter and said bearing pin; a lubricant reservoir in said lubricant reservoir containing lubricant;
   a first passage through said head and said bearing pin communicating from said lubricant reservoir to said cavity; and
   a bearing element located in said cavity supporting said cone cutter for rotation about said bearing pin, said bearing element having a matrix of pressed porous sintered ferrous alloy powder and an anti-galling material infiltrated into said pressed porous sintered ferrous alloy powder matrix throughout substantially all of said bearing element.

9. The bearing element of claim 8 wherein said matrix is a case hardened matrix.

* * * * *

UNITED STATES PATENT OFFICE
CERTIFICATE OF CORRECTION

Patent No. 3,984,158    Dated October 5, 1976

Inventor(s) Robert Keith Sorensen and Anthony T. Rallis

It is certified that error appears in the above-identified patent and that said Letters Patent are hereby corrected as shown below:

Column 6, line 39, after "in" insert:
-- said head, --.

Column 6, line 38, "A" should read -- a --.

Signed and Sealed this

First Day of February 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,984,158

DATED : October 5, 1976

INVENTOR(S) : Robert Keith Sorensen et al.

It is certified that error appears in the above—identified patent and that said Letters Patent is hereby corrected as shown below:

Column 5, line 52, after "surface" insert -- and extending throughout substantially all of said bearing element --.

Signed and Sealed this

Twenty-fourth Day of November 1981

[SEAL]

Attest:

GERALD J. MOSSINGHOFF

Attesting Officer        Commissioner of Patents and Trademarks